Oct. 22, 1968  J. F. HOBBINS  3,406,586
SOUND AND VIBRATION INSULATED GEAR SHIFT STICK
Filed May 6, 1966  2 Sheets-Sheet 2
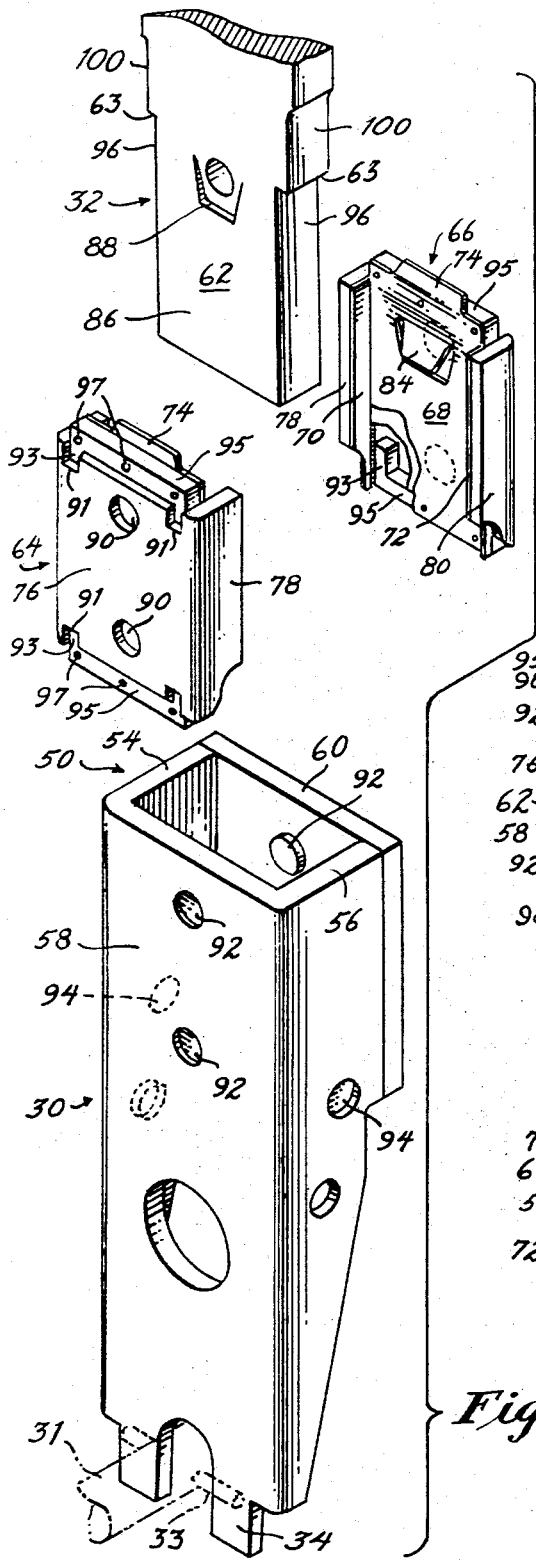
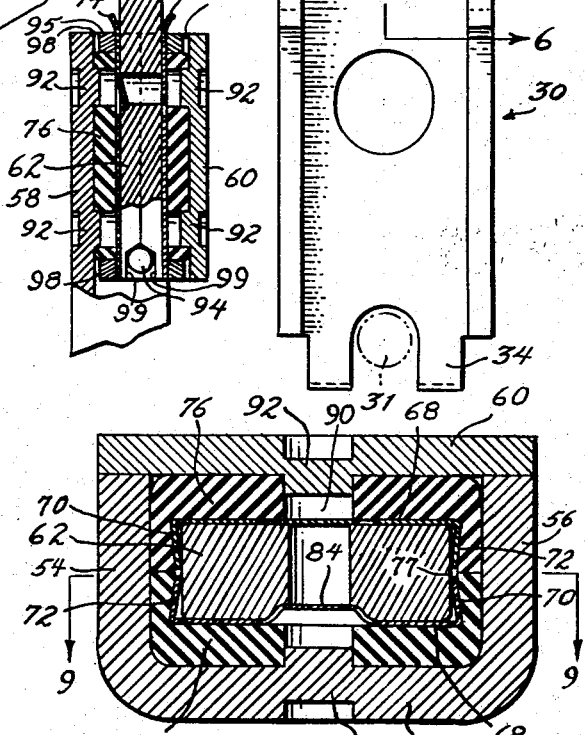
INVENTOR
JAMES F. HOBBINS
ATTORNEY United States Patent Office 3,406,586
Patented Oct. 22, 1968

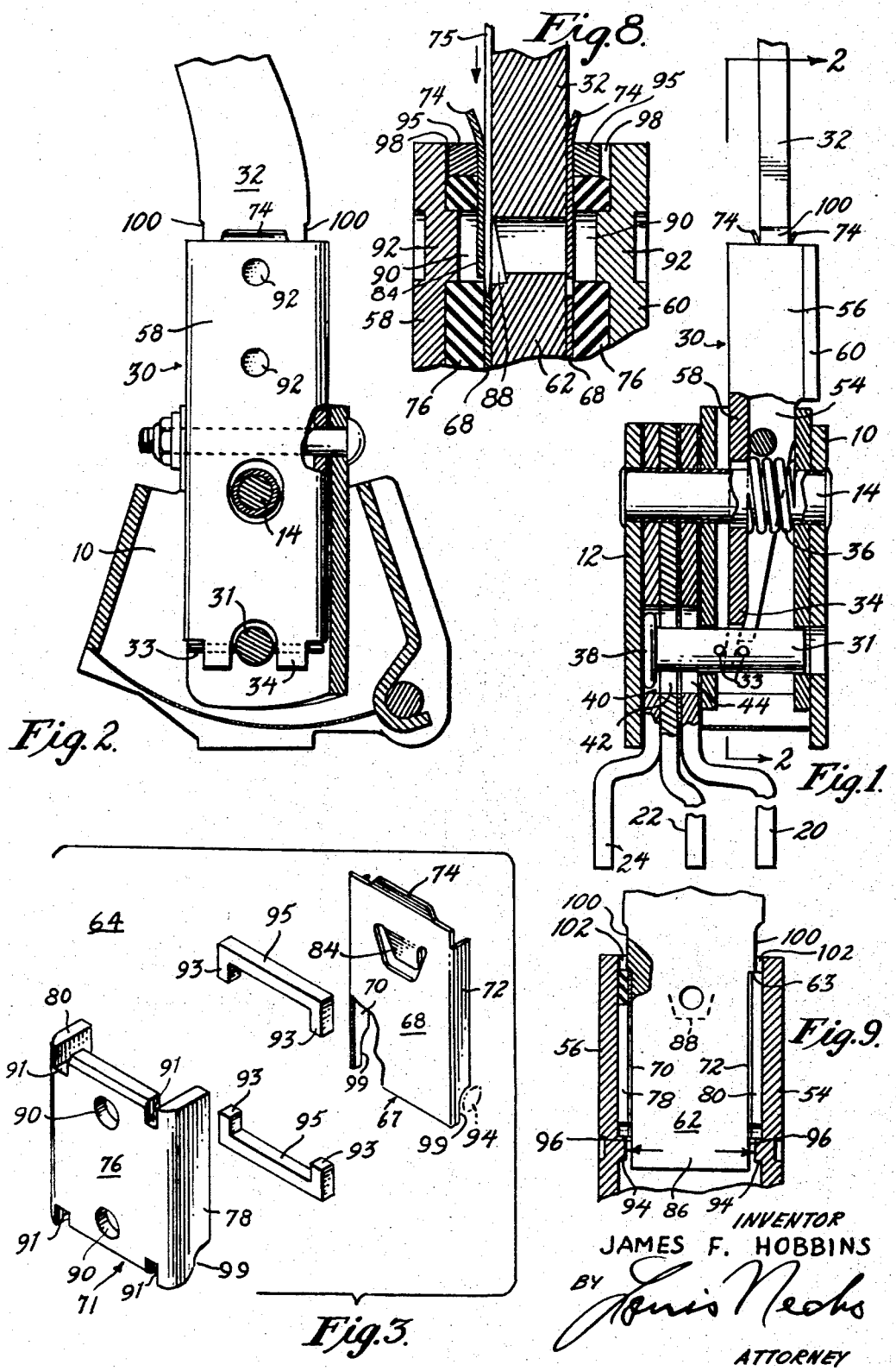

3,406,586
SOUND AND VIBRATION INSULATED
GEAR SHIFT STICK
James F. Hobbins, Philadelphia, Pa., assignor to Hurst-Campbell, Inc., Warminster, Pa., a corporation of Pennsylvania
Filed May 6, 1966, Ser. No. 548,273
10 Claims. (Cl. 74—473)

ABSTRACT OF THE DISCLOSURE

A resilient, compressible mounting connecting the gear shift stick to the selector pin which is engageable to the gear shifting levers, to prevent the transmitting of vibrations and noises from the transmission and adjacent parts to the shift stick.

---

This invention relates to a gear shifting mechanism of the type which includes a free standing shifting stick which is manually operated by the driver.

Experience has shown that, despite the use of springs and other expedients, the vibrations originating in the transmission and elsewhere are conducted to the shifting stick, thus causing the shifting stick to vibrate, or to generate an audible hum, or both.

It is therefore the object of this invention to produce an improved construction wherein the shifting stick is thoroughly insulated from the sources of vibration so as to eliminate, or to reduce the hum or vibrations to an unobjectionable level.

A further object of the invention is to produce an improved construction which is readily adaptable to various types and makes of gear shifting mechanisms.

A still further object is to produce an improved construction which is inexpensive to produce and easy to install or to remove.

The full nature of the invention will be understood from the specification and the accompanying drawings in which:

FIG. 1 is a fragmentary vertical sectional view of a gear shifting mechanism provided with a shifting stick embodying this invention.

FIG. 2 is a view partly in section and partly in elevation, looking in the direction of line 2—2 on FIG. 1.

FIG. 3 is an enlarged exploded perspective view of the components of which the sound and vibration damping devices of my invention are formed.

FIG. 4 is an enlarged, exploded, perspective view showing how the parts of FIG. 3 are assembled and the lower end of the shift stick and the connecting element which transmits the force exerted by the shift stick to the gear train actuating plates.

FIG. 5 is a side elevational view showing the parts of FIG. 4 assembled and ready for use.

FIG. 6 is a sectional view looking in the direction of line 6—6 on FIG. 5.

FIG. 7 is an enlarged sectional view looking in the direction of line 7—7 on FIG. 5.

FIG. 8 is an enlargement of the upper portion of FIG. 6.

FIG. 9 is a sectional view looking in the direction of line 9—9 on FIG. 7.

In the following specification and in the accompanying drawings, only so much of the structure of the gear mechanism proper is shown as is necessary for proper understanding of this invention and for details of the structure and operation of the gear shifting mechanism itself, reference may be had to Patent No. 2,922,315 and to Patent No. 3,052,135, as well as to the references cited therein. However, in order to obviate, or to minimize, reference to the prior patents, the parts of the gear shifting mechanism which are physically involved in this invention will be briefly described.

As can be seen from FIG. 1, a conventional gear shift mechanism to which this invention is applicable, includes a housing formed, in part, of outer walls 10 and 12 which are fixedly mounted on an assembly bolt or sleeve 14, which engages aligning openings in said walls. Assembly bolt 14 rotatably supports reverse gear actuating lever 20, first and second forward speed gear actuating lever 22, and third and fourth forward speed gear actuating lever 24. Obviously, the invention is equally applicable to a three-forward speed gear shifting mechanism.

According to this invention, the shift stick 32 is selectively connected to gear train activating levers 20, 22 or 24 by means of pin moving member 30, the lower end of which is provided with a yoke 34 which straddles engaging pin 31 at a point between lugs 33. The manner in which the actual shifting is carried out forms no part of this invention and it is set forth in the patents aforesaid. But, to minimize the necessity for reference, it is pointed out that pin 31 corresponds to pin 68 in Patent No. 3,052,135, and that movement of member 30 transversely of the axis of pin 31 will move the engaging head 38 of the pin with one or another of openings 40, 42 or 44 which are formed in gear actuating levers 24, 22 and 20, respectively. It will be noted that, when the shift stick 32 is unrestrained, spring 36 will bias pin 31 to the position of FIG. 1 in which it is engaged with third and fourth forward gear actuating lever 24.

To shift into first, or second gear, member 30 must be moved, against the action of spring 36, to cause head 38 to enter opening 42 in selector lever 22, and to shift into reverse, member 30 must be moved still further to cause head 38 to enter opening 44 in reverse lever 20. Member 30 is moved by shift stick 32 to which it is connected as hereinafter set forth. The structure and operation so far described form no part of this invention.

To carry out this invention, the upper portion of a pin engaging and moving member 30 is provided with a socket 50 which is formed of front and rear walls 54 and 56 and side walls 58 and 60 and which is adapted snugly to receive the sound and vibration insulating devices 64 and 66 of this invention. See FIG. 4. Since damping devices 64 and 66, which are interposed between pin moving member 30 and the shift stick 32 are identical, it is thought that a detailed description of one of them, such as device 64, will suffice. In FIG. 3, insulating device 64 includes an inner U-shaped member 67 which may be made of metal or some other material which is sufficiently rigid and sufficiently smooth, and an outer U-shaped member 71 which is made of rubber, or other compressible, sound and vibration damping material. Inner member 67 is formed of a plate 68, side walls 70 and 72 and an upper lip 74. Outer member 71 is formed of plate 76 and side walls 78 and 80 which correspond to plate 68 and side walls 70 and 72 of inner member 67. To assemble insulating device 64, the inner member 67 is nested within the outer member 71 with the visible face of place 68 of the inner member, as viewed in FIG. 3, abutting the invisible face of plate 76 of the outer member, and with the outer faces of side walls 70 and 72 abutting the inner faces of walls 78 and 80. When inserted into the socket 50, the visible face of plate 76 of insulating device 64, as viewed in FIG. 4, will abut the inner face of wall 58 of the socket; the invisible face of plate 76 of insulating device 66 will abut the inner face of wall 60 of the socket, and the side walls 78 and 80 of each of the outer members 71 will abut corresponding portions of front and rear walls 54 and 56 of the socket.

When devices 64 and 66 are inserted into the socket, they coact to form a chamber for receiving the lower end 62 of the shift stick, as generally shown in FIG. 7. The chamber formed by the juxtaposed surfaces of damping devices 64 and 66 is smaller than the lower end portion 62 of the shift stick so that the insertion of the lower end of shift stick 32 compresses the opposite walls 76 of the insulating devices. This is evidenced by the clearance 77 which appears between the juxtaposed edges of walls 70 and 72 of the insulating devices 64 and 66, FIG. 7. In other words, if the shift stick is withdrawn, the gap 77 between the vertical edges of juxtaposed walls 70 and 72 will disappear.

Plate 68 of either, or of both, of insulating devices 64 or 66 has a tab 84 struck out therefrom and bent inwardly of the plane thereof. It will be noted that tab 84 is connected to bight plate 68 along its upper edge only and that the material of plate 68 is somewhat springy.

One, or both, of the sides 86 of lower end 62 of the shift stick is ramped downwardly and is provided with a recess having a squared bottom edge 88 whereby, when end 62 is inserted into the socket, square edge 88 can be moved to a point below tab 84. By this arrangement, if the shift stick is moved upwardly, the lower edge of the tab will engage square edge 88 and will prevent withdrawal of the shaft stick. To withdraw the shift stick, a thin instrument, such as a knife blade 75 is inserted between side 86 of the shift stick and tab 84 to close, or collapse, the latter. The outward curvature of upper lips 74, as shown in FIGS. 6 and 8, facilitates the insertion of the blade, FIG. 8.

To secure insulating devices 64 and 66 to the socket and to insure their proper alignment, plates 76 of said devices are provided with recesses 90 which receive bosses 92 which protrude inwardly from side walls 58 and 60 of socket 50. It will be noted that the engagement of shoulders 63 of the shift stick with the upper edges of wall 70 and 72 and 78 and 80 of the insulating devices, limits the downward movement of the shift stick relative to pin moving member 30.

To secure the outer, insulating liner 71 to the inner metal member 67, the upper and lower edges of plates 76 are provided with recesses 91 which are adapted to receive lugs 93 at the ends of bars 95 which are secured, as by spot-welding 97, to inner metal plates 68 of devices 64 and 66 just below lips 74. FIG. 4.

Surrounding the lower end of the shift stick with compressible material effectively insulates against vibration but it does not efficiently transfer the force applied to the shift stick to pin moving member 30. This is due to the fact that, when the shift stick is moved toward either of walls 54 or 56 of the socket, FIG. 9, it compresses the walls 78 and 80 before it can move pin moving member 30. In other words, the yielding of walls 78 and 80 creates a feeling of doubt as to whether the intended shifting had, indeed, been accomplished. To protect walls 78 and 80 against damage due to over-compression, and to provide for efficient force-transmission, I provide walls 54 and 56 with inwardly projecting bosses 94 which are adapted to be engaged by the front and rear faces 96 of lower end 62 of the shift stick as shown by the arrows in FIG. 9. In other words, as the shift stick is moved back and forth, the front or the rear face 96 of the shift stick will engage the corresponding boss 94. Simultaneously, the relieved portion 100 of the front or rear face 96 of the shift stick will bear against the upper edge of the front or the rear wall 54 or 56 of the socket which serve as a fulcrum for the movement of the shift stick. By this arrangement a "rigid" force transmitting connection is provided which gives the feel of effectiveness and protects the compressible parts against damage due to repeated, and/or overcompression.

To make sure that the shift stick, when unrestrained, does not touch the walls of socket 50, bars 95 are spaced from side walls 58 and 60 as at 98 and the front and rear walls of the shift stick above shoulders 63 are relieved as at 100. In order to expose front and rear pins 94 for engagement with the front and rear faces of the shift stick, the lower ends of walls 70 and 72 and 78 and 80 are cut away as at 99.

It will be seen from the foregoing that the shift stick is assembled by simply pushing it into the socket as far as it will go; that the mere insertion of a blade 75 between the side wall 86 of the shift stick and plate 68, permits instant withdrawal of the shift stick; that the shift stick bears against pins 94 and against the edges of walls 54 and 56 of socket 50 only during the act of shifting; that when the shift stick is in position, the compression of opposite walls 76, causes the inner members 67 of the opposite devices 64 and 66 to separate as at 77 in FIG. 7, and that, when unrestrained, the shift stick will assume a central position in which it will have no metal to metal contact with pin moving member 30 which is connected to the transmission and is subject to all the vibrations generated below the floor board of the vehicle.

What I claim is:

1. For use with a gear shifting mechanism of the type which includes a plurality of gear actuating levers, a pin selectively engageable with said levers, and
 a noise and vibration damping means connecting the lower end of the shift stick to said pin,
 said damping means including:
 a socket engaging the lower end of said shift stick and said pin, a resilient lining between said socket and the lower end of said stick,
 there being recesses in said lining, and
 boxes protruding inwardly from opposite walls of said socket and engaging said recesses.

2. For use with a gear shifting mechanism of the type which includes a plurality of gear actuating levers, a pin selectively engageable with one of said levers, and a shift stick for moving said pin into, and out of, engagement with said levers,
 a wall structure defining a socket engaging the lower end of the shift stick and the pin,
 a noise and vibration damping lining between said socket and the lower end of the shift stick,
 a plate abutting the inner face of said lining,
 there being recesses in the lower end of the shift stick, and
 a resilient tab carried by said plate and engageable with said recesses only upon movement of the shift stick outwardly of said socket.

3. In a gear shifting mechanism of the type which includes a plurality of gear actuating levers, a selector pin engageable with any of said levers, and a shift stick for controllably moving said pin,
 a pin moving member connected at its lower end to said pin,
 a socket formed at the upper end of said pin moving member,
 an outer, two section, sound and vibration damping lining covering the interior of said socket,
 an inner, two section, smooth, non-compressible lining covering the interior of said outer lining and forming a chamber for snugly receiving the lower end of the shift stick, the opposed edges of the two sections of the inner and of the outer linings normally abutting each other, the space between said sections of said inner lining being less than the thickness of the lower end of the stick whereby insertion of said lower end between the sections of the inner lining compresses said outer lining tightly to hold said outer and inner linings and the lower end of the stick and to separate the edges of the sections of the inner linings, and
 means carried by at least one section of said inner lining for preventing withdrawal of said lower end from said socket.

4. For use with a gear shifting mechanism of the type which includes a plurality of gear actuating levers and a selector pin engageable with any of said levers, a pin moving member,
means permanently engaging the lower end of said member with said pin,
a wall structure defining a socket at the upper end of said member,
means pivoting said member at a point between its upper and lower ends,
a shift stick, and
fastening means for detachably securing the lower end of the stick to the upper end of said pin moving member, said means comprising:
two generally U-shaped sound and vibration damping devices which, when inserted with their edges in abuttment, in said socket completely line the interior thereof,
each of said devices being formed of an outer compressible member and an inner non-compressible member nested within said outer member,
the inner non-compressible members coacting to form a chamber for receiving the lower end of the shift stick.

5. The structure defined in claim 4 wherein the space between said non-compressible members is smaller than the corresponding dimension of the lower end of the shift stick, whereby insertion of said lower end into said chamber compresses said compressible members and moves said non-compressible members apart.

6. The structure recited in claim 4 and a resilient pendent tab projecting inwardly from at least one of said noncompressible members and movable out of the path of movement of the lower end of the stick during the insertion of the latter into said chamber,
there being a recess formed in the corresponding side of the lower end of the shift stick for receiving the lower edge of said tab to prevent withdrawal of the stick from the socket.

7. The structure recited in claim 5 and a shoulder formed on the lower end of the shift stick and engageable with the upper edges of the damping devices to limit the insertion of the shift stick into the socket.

8. The structure recited in claim 4 wherein, when unrestrained, the shift stick is held by said devices in a central position in which it is completely out of contact with the walls of the socket.

9. The structure defined in claim 7 wherein the faces of the shift stick which, in the operative position of the stick register with the corresponding upper edges of said socket, are relieved to insure against the shift stick contacting said edges during the actual shifting operation.

10. The structure defined in claim 7 and lugs projecting inwardly from the front and rear walls of said socket and engageable with corresponding faces of the lower end of the shift stick upon the shifting movement of the shift stick to transmit the force exerted on the shift stick to said pin moving member.

References Cited
UNITED STATES PATENTS

| | | | |
|---|---|---|---|
| 1,927,646 | 9/1933 | Miller | 74—473 |
| 2,844,168 | 7/1958 | Klingler | 137—630 |
| 2,922,315 | 1/1960 | Primeau | 74—473 |

FRED C. MATTERN, JR., *Primary Examiner.*

B. T. CALLAHAN, *Assistant Examiner.*